(12) United States Patent
Moddemann

(10) Patent No.: US 6,603,279 B2
(45) Date of Patent: Aug. 5, 2003

(54) ELECTRIC MOTOR DRIVE AND PROCESS FOR OPERATING AN ELECTRONICALLY COMMUTATED ELECTRIC MOTOR

(75) Inventor: Jörg Moddemann, Hohberg (DE)

(73) Assignee: Berger Lahr GmbH & Co. KG, Lahr (DE)

( * ) Notice: Subject to any disclaimer, the term of this patent is extended or adjusted under 35 U.S.C. 154(b) by 0 days.

(21) Appl. No.: 09/934,416

(22) Filed: Aug. 21, 2001

(65) Prior Publication Data

US 2002/0067148 A1 Jun. 6, 2002

(30) Foreign Application Priority Data

Aug. 24, 2000 (DE) .......................... 100 41 606

(51) Int. Cl.$^7$ .................... H02K 23/00; H02K 1/18; H02K 3/08; H02K 5/06; H02K 7/06
(52) U.S. Cl. ........................ 318/254; 318/439
(58) Field of Search ................ 318/244, 245, 318/254, 499

(56) References Cited

U.S. PATENT DOCUMENTS 5,751,128 A * 5/1998 Chalupa et al. ............. 318/439
6,249,094 B1 * 6/2001 Zeh et al. .................... 318/254

FOREIGN PATENT DOCUMENTS

| DE | 4118829 C2 | 11/1993 |
|---|---|---|
| DE | 4322146 A1 | 1/1995 |
| DE | 4330823 C2 | 12/1997 |
| FR | 2724789 | 9/1994 |
| GB | 2281826 | 3/1995 |

OTHER PUBLICATIONS

Sadegh Vaez, M.A. Rahman, An On–Line Loss Minimization Controller for Interior Permanent Magnet Motor Drives, Dec. 1999, 1435–1440.

Edward Hopper, Servo–Modul bedient unterschiedliche Motoren und Sensoren, Sep. 1999, 6–7.

* cited by examiner

*Primary Examiner*—Jeffrey Donels
(74) *Attorney, Agent, or Firm*—Volpe and Koenig, P.C.

(57) ABSTRACT

In a process for operating an electronically commutated electric motor (2), a signal value signal for the commutation position of the rotor of the electric motor (2) is readied, and the windings of the electric motor (2) are supplied with current such that the rotor of the electric motor (2) is positioned on the commutation position specified by the standard value signal. A measuring signal for the position of the rotor of the electric motor (2) is recorded, evaluated and compared with the standard value signal for the commutation position. The current supply of the windings of the electric motor (2) is interrupted if the position measuring signal and/or the standard value signal for the commutation position exceed a specified highest value, and/or if the differential signal between the position measuring signal and the standard value signal for the commutation signal lie outside a specified tolerance range.

2 Claims, 2 Drawing Sheets

ELECTRIC MOTOR DRIVE AND PROCESS FOR OPERATING AN ELECTRONICALLY COMMUTATED ELECTRIC MOTOR

BACKGROUND

The invention relates to a process for operating an electronically commutated electric motor whereby a standard value signal is readied for the commutating position of the electric motor and the windings of the electric motor are acted upon by current such that the rotor of the electric motor is positioned on the commutating position specified by the standard value signal, and whereby a measuring signal for the position of the rotor of the electric motor is recorded.

The invention moreover relates to an electric motor drive with an electric motor which is connected with the a.c. system through a frequency converter, whereby the frequency converter is connected with a control apparatus which has a terminal connection for a standard value signal for the commutating position of the rotor of the electric motor, and whereby a position measuring apparatus having a position sensor for measuring the rotor position is provided.

An electric motor drive of the type mentioned at the beginning is already known from practice which has two position sensors for measuring the rotor position of the electric motor. The position sensors are generally constructed as rotary transducers which are rigidly coupled with the axis of the rotor of the electric motor. The measuring signal outputs of these position sensors are in any given case connected with an input of a comparison device by means of which the measuring signals of the two position sensors can be compared with each other. The output of the comparison device is connected to a shut off apparatus which interrupts the current feed to the electric motor if a difference between the two measuring signals of the position sensors is detected which lies outside the specified tolerance range. The electric motor drive makes possible a secure monitoring of the motion of the rotor of the electric motor. The electric motor drive, however, has the disadvantage that position sensors are comparatively costly and expensive. In addition, the two position sensors mechanically connected with the electric motor have a certain space requirement.

An electric motor drive of the type mentioned at the beginning which has only one position sensor for measuring the rotor position is also already known from practice. The measuring signal output of the position measuring apparatus is connected with the inputs of two monitoring devices which monitor the measuring signal of the position sensor independently of each other. By means of the monitoring devices, certain typical errors of the position measuring device are recognizable, as for example the occurrence of a cable disruption, an unplausible position measuring signal or an electrical output voltage applied to the measuring signal output of the position measuring device which lies outside an allowable tolerance range. If one of the two monitoring devices detects such an error, the electric motor is shut off. The costs for a second position measuring device can indeed be saved by the two monitoring devices, but the monitoring devices are also comparatively costly and expensive. It is moreover unfavorable that the error recognition functions of the monitoring devices must be specially harmonized with the position measuring device so that, for electric drives with different position measuring devices, different monitoring devices are also necessary which makes above all the development and bearing maintenance costs for the monitoring devices greater.

From DE 43 22 146 A1, an electric motor drive is also already known where the intermediate circuit voltage is reducible by interposing a transformer. With reduced intermediate circuit voltage, the rotational speed of the electric motor is determined by evaluation of rotation frequency and compared with a specified threshold value. When this threshold value is exceeded, the electric motor is shut off. The electric motor drive has, however, only a comparatively low operating safety since faulty positioning of the rotor only leads to shutting off the electric motor if the rotor rotational speed exceeds the rotational speed threshold value. By utilizing the rotating field, a mechanical component for the rotational speed measuring facility can indeed be saved, but the measurement of the rotating field is nonetheless still associated with a certain expense. It is moreover not beneficial that the electric motor, due to the reduced intermediate circuit voltage, only enables a comparatively low rotational speed and a low acceleration.

From DE 43 30 823 C2, a regulated electric motor drive is already known where the rotational speed of the electric motor is monitored twice. In a first monitoring channel, the rotational speed of the electric motor is ascertained with a rotational speed sensor coupled with its rotor axis and the electric motor is shut off when the measuring signal of this rotational speed sensor exceeds a specified threshold value. The electric motor is regulated by means of a governor which has a cascade structure whereby a rotational speed regulator is connected in series in front of a current regulator and a position regulator is in turn connected in series before this. In a second monitoring channel, the course of the current over time is monitored in at least one phase supply lead and the rotational speed of the motor is ascertained from the course of the current. If the rotational speed signal thus ascertained exceeds a specified threshold value, the electric motor is shut off. Even this electric motor drive has only a comparatively low operating safety as faulty positioning of the rotor even here only leads to shutting the electric motor off when a rotational speed threshold value is exceeded.

SUMMARY

There thus exists the object of creating a process for operating an electronically commutated electric motor which makes possible monitoring of motion and consequently a safe operation of the electric motor in a simple manner. There moreover exists the object of creating a simply constructed electric motor drive which makes possible a secure, motion-monitored operation of the electric motor.

This objective is accomplished in accordance with the present process in that a standard value signal for the commutating position of the rotor of the electric motor is readied and the windings of the electric motor are subjected to current such that the rotor of the electric motor is positioned on the commutating position specified by the standard value signal, that a measuring signal for the position of the rotor of the electric motor is recorded and compared with a standard value signal for the commutating position, and that current to the windings of the electric motor is interrupted when the position measuring signal and/or the standard value signal for the commutating position exceed a specified maximum value, and/or if the differential signal between the position measuring signal and the standard value signal for the commutating position lie outside a specified tolerance range.

The aforementioned object is accomplished in relation to the electric motor drive in that the electric motor is connected to the a.c. network through a frequency converter, and in that the frequency converter has a control apparatus which has a terminal connection for a standard value signal for the commutating position of the rotor of the electric motor, in that a position measuring device having a position sensor for measuring the rotor position is provided, in that the measuring signal output of the position measuring device and/or the terminal for the standard value signal are connected with the outputs of at least one comparison device the output of which is connected with a shut off device for shutting the electric motor off when a specified maximum value is exceeded by the position measuring signal and/or the standard value signal for the commutating position and/or when a difference lying outside a specified tolerance range arises between the standard value signal and the measuring signal of the position measuring device.

Advantageously, the existing standard value signal for the commutating position of the electric motor rotor is used for monitoring the position of the rotor so that in addition to the measuring signal for the position of the rotor, a further signal enabling a monitoring of the rotor position is evaluated. In this way, the invention makes use of the knowledge that the rotor of the electric motor can only rotate if the current or voltage vector applied to the windings of the electric motor also rotates. On the basis of the commutating position, the position of the rotor can thus be inferred. It consequently represents a second channel for recording position in relation to the first channel consisting of the position measuring device. A costly and expensive second position measuring device can consequently be saved. Through the comparison of the two signals with each other and/or of at least one of the signals with the specified maximum value as well shutting off the electric motor in the event of an error, the invention provides a way to conduct twofold monitoring of rotor motion which makes possible a safe operation of the electric motor.

BRIEF DESCRIPTION OF THE DRAWINGS

Embodiments of the invention are explained in greater detail below on the basis of the drawings, wherein, greatly schematized.

DETAILED DESCRIPTION OF THE PREFERRED EMBODIMENTS

Figure 1:
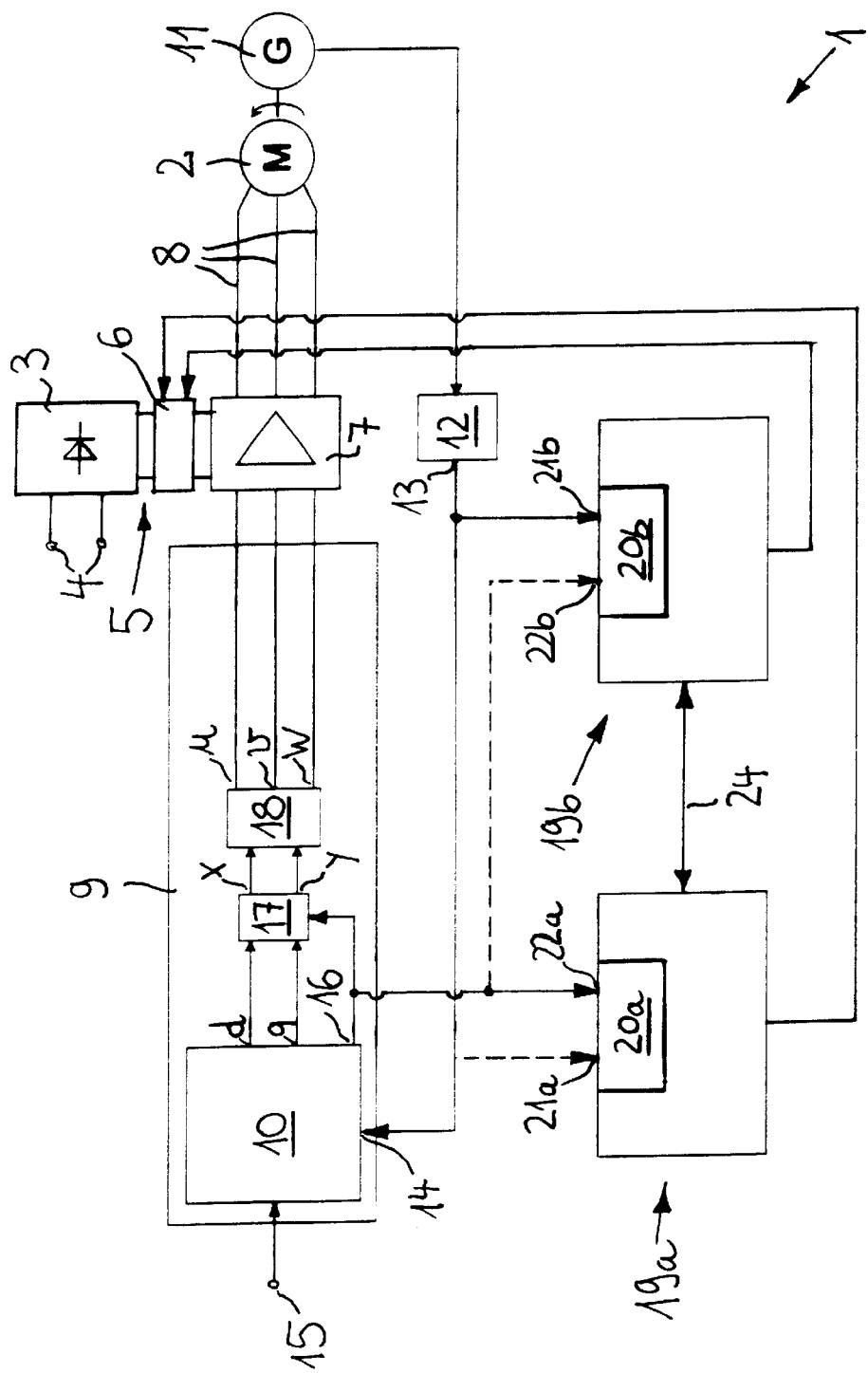
FIGS. 1 and 2 depict a circuit diagram of an electric motor drive where the motion of the rotor of the electric motor is monitored over two channels.

An electric motor drive designated overall with 1 has an electric motor 2 which is connected to the a.c. network through a frequency converter. The frequency converter has a rectifier 3, the input terminals 4 of which are connected with the a.c. network and its output connections are connected with a direct voltage intermediate circuit The intermediate circuit 5 is connected to a final stage 7 through a shut off device 6. The final stage 7 has a bridge circuit, not represented in greater detail in the drawing, which has in any given case a half bridge with two bridge branches in which, for each winding strand of the electric motor 2, at all times a semiconductor switch is arranged. The two bridge branches of each half bridge are, in any given case, connected with each other with one of their connections, and with their other connection to different poles of the intermediate circuit 5. The bridge midpoints forming the connecting points of the bridge branches are, in any given case, connected over a supply lead 8 with a current supply terminal connection of the electric motor 2. By means of the final stage 7, the intermediate circuit voltage applied to final stage 7 and/or an auxiliary voltage provided for controlling the semiconductor switch of the final stage 7 are shut off, so that then the current supply to the electric motor is interrupted.

The frequency converter has a control apparatus 9 by means of which the semiconductor switch arranged in the bridge branches of the half bridge are controllable in accordance with a specified pulse duration modulation switching pattern such that a rotating field is formed in the windings of the electric motor.

With the embodiment according to FIG. 1, the control apparatus 9 has a regulating unit 10 which has a cascade structure not represented in greater detail in the drawing where a rotational speed regulator is placed in front of a current regulator and a position regulator is in turn connected in front of it. The current regulator has output terminal connections d, q for the components of control signal vectors related to a rotor-based coordinate system which represents the vectorial sum of the electric currents to be fed into the windings of the electric motor 2 over leads 8. The electric motor 2 is constructed as a three phase servo motor in the embodiment according to FIG. 1.

The drive 1 moreover has a position measuring device with a position sensor 11 constructed as rotation angle detector which is mechanically connected with the shaft of the electric motor rotor and can, for example, be constructed as an optical encoder. A signal readying apparatus 12 is connected in series after the position sensor 11 by means of which the output signal of the position sensor 11 is transformed into a square wave signal which applies to the measuring signal output 13 of the position measuring apparatus. The measuring signal output 13 is connected with a first input 14 of a differential element to the second input 15 of which a standard position signal for the position of the electric motor rotor applies. The output of this differential element is connected with the input of the position regulator. With the embodiment according to FIG. 2 where the electric motor 2 is a stepping motor, the first output 14 and the differential element can if need be omitted, which is indicated by a terminal lead represented with dotted lines between the measuring signal output 13 and the first input 14. In this case, the stepping motor remains controlled.

The control apparatus 9 moreover has a terminal connection 16 for a standard value signal for the commutating position of the rotor of the electric motor 2. In the embodiment according to FIG. 1, current regulation is conducted in rotor-based coordinates, that means in a coordinate system which rotates along with the rotor of the electric motor 2. The commutating position then corresponds to the angle between the rotor-based control signal vector whose components are applied to connections d, q of regulator 10 and a reference axis of the coordinate system of the stator.

The control device 9 has a first transformation device 17 by means of which the control vector related to the rotor is transformed into a control vector related to a stator-based coordinate system the components of which are applied to the output terminals x, y of the transformation device. A second transformation device 18 is connected in series after the first transformation device 17 by means of which the control signal vector applied to terminal connections x, y is split up into a number of components corresponding to a number of phases of electric motor 2. These components apply to output connections u, v, w of the second transformation device 18 and form the standard values for the current per winding to be fed into the individual winding strands of electric motor 2.

If need be, instead of the current regulator, a voltage regulator can also be provided for regulating the electrical voltages to be applied to the windings of electric motor 2. The standard values for the voltages to be applied to the windings of electric motor 2 then apply to output terminals u, v, w of the second transformation device 18.

The standard value signal for the commutation position is fed to a first monitoring device which has a comparison device 20a for comparing the standard value signal with a specified standard value signal maximum value. A first input 22a of the first comparison device 20a is for this purpose connected with the terminal connection for the standard value signal of the commutation position. A second input of first comparison apparatus 20a not represented in greater detail in the drawing is connected with a memory in which the standard value signal maximum value is deposited. An output of first comparison device 20a is connected with a first control input of shut off apparatus 6. Through this control input, the supply of current to the windings of the electric motor 2 is interrupted when the commutation position standard value signal exceeds the specified maximum value.

Figure 2:
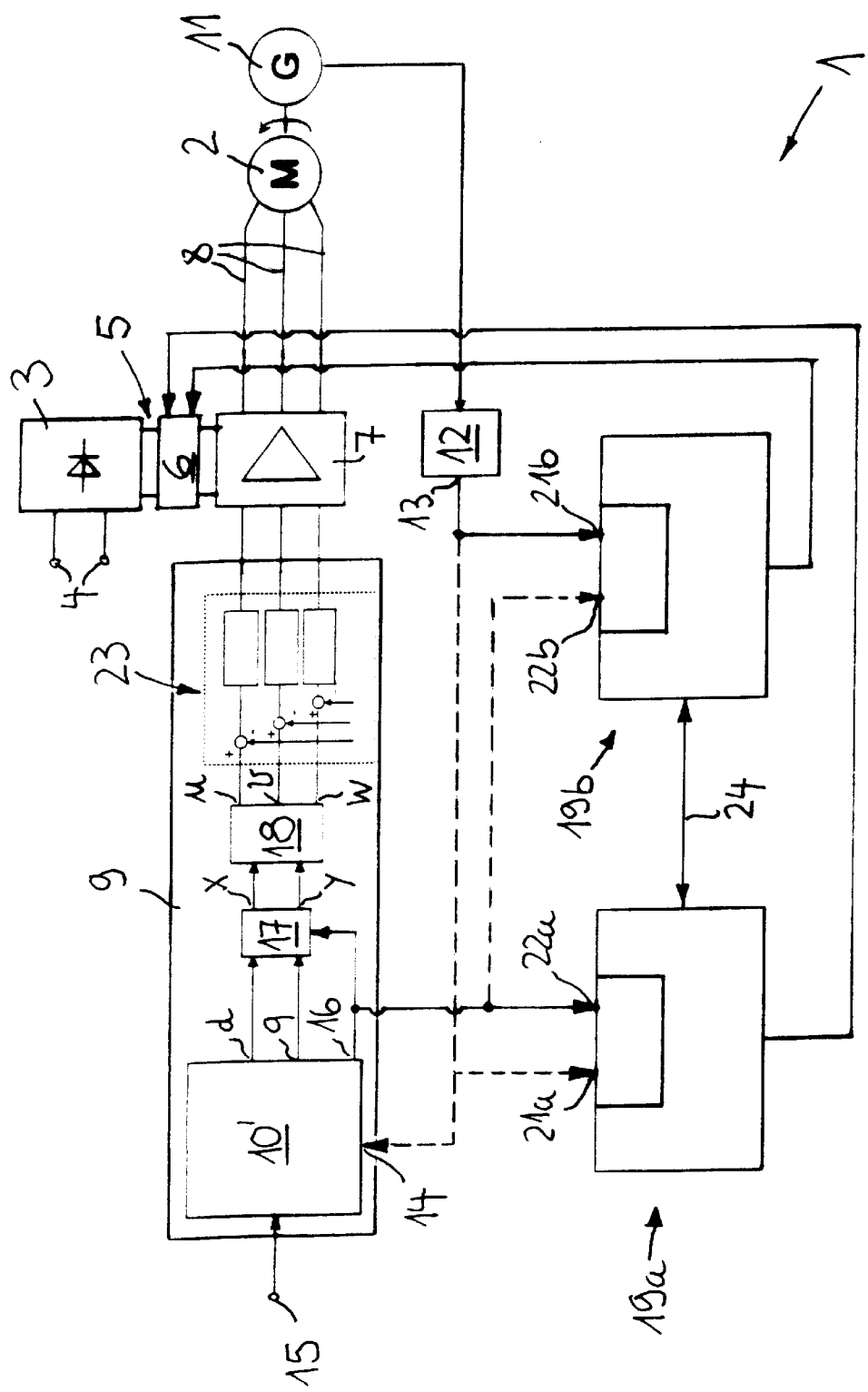

If need be, the first comparison device 20a has yet a third input 21a which is connected with the measuring signal output 13 of the position measuring apparatus. In FIGS. 1 and 2, the corresponding terminal lead is drawn in dotted lines in each case. In the first comparison apparatus 20a, a differential signal for revealing an error can only be formed on the basis of the position measuring signal and the standard value signal, and be compared with a specified tolerance range. In the event that the comparison makes apparent that the differential signal lies outside a specified tolerance range, the current supply to the windings of the electric motor 2 is interrupted by issuing an appropriate control signal to the first control input of the shut off apparatus 6.

The measuring signal for the position of the rotor of the electric motor is fed to a second monitoring device 19b which has a comparison apparatus 20b for comparing this measuring signal with a specified measurement signal maximum value deposited in the monitoring device 19b. A first input 21b of the second comparison device 20b is connected with the measuring signal output 13 for this. A second input of the second comparison apparatus 20b not represented in greater detail in the drawing is connected with a memory in which the measuring signal maximum value is deposited. An output of the second comparison device 20b is connected with a second control input of the shut off apparatus 6. Through this control input, the current supply to the windings of electric motor 2 is interrupted when the measuring signal exceeds the specified maximum value.

If need be, the second comparison apparatus 20b can have yet a third input 22b which is connected with the measuring signal output 13 of the position measuring facility. In FIGS. 1 and 2, the corresponding connection lead is drawn in dotted lines in each case. In the second comparison apparatus 20b, a differential signal for disclosing an error is likewise only formed on the basis of the position measuring signal and the standard value signal and compared with a specified tolerance range. In the event that the comparison reveals that the differential signal lies outside a specified tolerance range, the current supply to the windings of the electric motor 2 is interrupted by issuing a corresponding control signal to the second control input of the shut off device 6. Thus, a two channel monitoring of the position of the electric motor rotor with shut off of the electric motor 2 in the event of an error takes place.

With the embodiment according to FIG. 2, the electric motor 2 is a stepping motor. The control device 9 has in this embodiment a regulator with a cascade structure which includes a current regulator 23 which is connected in series before a rotational speed and position regulator 10'. The governor has output terminal connections d, q for the components of a control signal vector which from standard values for the vectorial sum of the electrical currents to be fed into the windings of the electric motor 2 over the leads 8. The control device 9 moreover has a terminal 16 for a standard value signal for the commutation position of the electric motor rotor.

In the embodiment according to FIG. 2, the control device 9 has a first transformation apparatus 17 by means of which the control signal vector applied to the output connections d, q related to the rotor based coordinate system is transformed into the control signal vector applying to output terminal connections x, y. A second transformation unit is connected in series after the first transformation unit 17 by means of which the control signal vector x, y is broken down into three components which apply to the output terminals u, v, w and which form the standard values for the current per winding to be fed into the individual windings of electric motor 2. Correspondingly, in the case of an n phase electric motor 2 (n=2, 3, 4, 5 . . . ), the control signal vector will be split up into n components.

It is recognizable in FIG. 2 that current regulation is conducted in stator-based coordinates. The commutation position then corresponds to the angle between the components applying to the output connections u, v, w of the control signal vector measured at the stator. Since the current regulation taking place in the stator-based coordinates can result in a slight phase shift between the control signal vector applying to the output terminals u, v, w and the voltage vector applying to the windings of electric motor 2, the commutation position can, in connection with the embodiment according to FIG. 2, deviate somewhat from the angle of the voltage vector with which the electric motor 2 is acted upon. The certainty of the motion monitoring of the electric motor 2 is practically not impaired by this comparative slight deviation. The position measuring device with position sensor 11, comparison devices 20a, 20b and the shut off apparatus 6 basically corresponds in the embodiment according to FIG. 1 with that according to FIG. 2.

With the embodiments according to FIGS. 1 and 2, the monitoring devices 19a, 19b are connected with each other through a bi-directional data interface 24. Through this data interface 24, additional information readied in monitoring devices 19a, 19b can be transmitted to the in any given case other monitoring apparatus 19a, 19b and compared there with the appropriate information from this monitoring unit 19b, 19a. This additional information can, for example, include threshold values for a velocity measuring signal formed on the basis of the position measuring signal or the standard value signal. If in the comparison of this information a deviation is established, the electric motor 2 is shut off. If need be, velocity measurement signals which are formed in the monitoring devices 19a, 19b either on the basis of the position measuring signal or the standard value signal for the commutation position can also be transmitted through data interfaces 24. The velocity measurement signals can then likewise be compared with one another, whereby the electric motor 2 is shut off if the difference between the velocity signal formed on the basis of the position measuring signal on the one hand and the velocity signal formed on the basis of the standard value signal for the commutation signal on the other lies outside a specified velocity tolerance range.

With the process for operating the electronically commutated electric motor 2, a standard value signal for the commutation position of the rotor is thus readied, and the windings of the electric motor 2 are provided with current such that the rotor of electric motor 2 is positioned on the commutation position specified by the standard value signal. A measuring signal for the position of the rotor of the electric motor 2 is recorded and evaluated as well as compared with the standard value signal for the commutation position. The current supply of the windings of electric motor 2 is interrupted when the position measuring signal and/or the standard value signal for the commutation position exceed a specified maximum value, and/or if the differential signal between the position measuring signal and the standard value signal for the commutation position lies outside a specified tolerance range.

What is claimed is:

1. A method for operating an electronically commutated electric motor (2), comprising:

generating a standard value signal for a commutation position of a rotor of the electric motor (2);

supplying current to windings of the electric motor (2) such that the rotor of the electric motor (2) is positioned on the commutation position specified by the standard value signal;

generating a position measuring signal for a position of the rotor of the electric motor (2) and comparing the position measuring signal with the standard value signal for the commutation position; and interrupting the current supplied to the windings of the electric motor (2) when at least one of the position measuring signal and the standard value signal for the commutation position exceed a specified maximum value, or if a differential between the position measuring signal and the standard value signal for the commutation position lies outside a specified tolerance range, or if at least one of the position measuring signal and the standard value signal for the commutation position exceed the specified maximum value, and the differential between the position measuring signal and the standard value signal for the commutation position lies outside the specified tolerance range.

2. An electric motor drive (1) for an electric motor (2) comprising:

a frequency converter having a control apparatus (9) which has a terminal (16) for a standard value signal for a commutation position of a rotor of the electric motor (2);

a position measuring device having a position sensor (11) for measuring a position of the rotor position;

at least one comparison unit (20*a*, 20*b*) having at least one input to which at least one of a measuring signal output (13) of the position measuring apparatus and the terminal connection (16) for the standard value signal is connected, and an output which is connected with a shut off device (6) for shutting off the electric motor (2) when the comparison unit detects that a specified maximum value is exceeded by at least one of the position measuring signal and the standard value signal for the commutation position, or when a difference between the standard value signal and the measuring signal of the position measuring apparatus lies outside a specified tolerance range, or if the comparison unit detects that the specified maximum value is exceeded by at least one of the position measuring signal and the standard value signal for the commutation position, and the difference between the standard value signal and the measuring signal of the position measuring apparatus lies outside the specified tolerance range.

* * * * *